US006415833B1

(12) United States Patent
Komatsu

(10) Patent No.: US 6,415,833 B1
(45) Date of Patent: Jul. 9, 2002

(54) PNEUMATIC TIRE HAVING ELECTRICALLY CONDUCTIVE RUBBER LAYER IN LAND PORTION DEFINED BETWEEN CIRCUMFERENTIAL GROOVES

(75) Inventor: Hideki Komatsu, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/232,182

(22) Filed: Jan. 15, 1999

Related U.S. Application Data

(63) Continuation-in-part of application No. 08/896,953, filed on Jul. 18, 1997, now abandoned.

(30) Foreign Application Priority Data

Jul. 18, 1996 (JP) .............................. 8-207877

(51) Int. Cl.⁷ ........................... B60C 1/00; B60C 11/00; B60C 19/08
(52) U.S. Cl. ................. 152/152.1; 152/209.5; 152/DIG. 2
(58) Field of Search ........................... 152/152.1, 209.5, 152/905, DIG. 2

(56) References Cited

U.S. PATENT DOCUMENTS

| | | | | |
|---|---|---|---|---|
| 2,339,546 A | | 1/1944 | Hanson | 152/DIG. 2 |
| 5,230,878 A | * | 7/1993 | Nakai et al. | 423/449.1 |
| 5,393,821 A | | 2/1995 | Shieh et al. | 524/495 |
| 5,518,055 A | | 5/1996 | Teeple et al. | 152/152.1 |
| 5,937,926 A | * | 8/1999 | Powell | 152/152.1 |
| 5,942,069 A | * | 8/1999 | Gerresheim et al. | 152/152.1 |

FOREIGN PATENT DOCUMENTS

| | | | |
|---|---|---|---|
| CH | 597 008 | | 3/1978 |
| DE | 40 02 628 A1 | | 8/1990 |
| EP | 0 658 452 A1 | | 6/1995 |
| EP | 681 931 | | 11/1995 |
| EP | 705 722 | | 4/1996 |
| EP | 715974 | * | 6/1996 |
| EP | 0 718 126 A2 | | 6/1996 |
| EP | 0 718 127 A1 | | 6/1996 |
| EP | 732 229 | | 9/1996 |
| EP | 0 747 243 A1 | | 12/1996 |
| EP | 0 754 574 A2 | | 1/1997 |
| EP | 847880 | * | 6/1998 |
| GB | 544757 | * | 4/1942 |
| JP | 56-79004 | * | 6/1981 ............ 152/209.5 |
| JP | 08-34204 | | 2/1996 |
| JP | 08-120120 | | 5/1996 |

OTHER PUBLICATIONS

Aminabhavi et al, "Electrical Resistivity of Carbon–Black Loaded Rubbers", Rubber Chemstry and Technology, vol. 63 pp 451–471, Jul.–Aug. 1990.*
Donnet et al, Carbon Black, pp. 19–21, 1976.*
Mark et al, Science and Technology of Rubber, pp. 432–442, 1994.*
European Search Report, dated Oct. 30, 1997.

* cited by examiner

*Primary Examiner*—Steven D. Maki
(74) *Attorney, Agent, or Firm*—Sughrue Mion, PLLC

(57) ABSTRACT

A pneumatic tire comprises a tread, in which a rubber layer having a specific resistance of not more than $10^6\,\Omega\cdot\text{cm}$ and a thickness of 0.1-1 mm forms a continuous layer extending in a circumferential direction of the tire while contacting with a surface portion of the tread having a specific resistance of not less than $10^8\,\Omega\cdot\text{cm}$ and a part of at least one member adjacent thereto in a radial direction.

5 Claims, 3 Drawing Sheets

PNEUMATIC TIRE HAVING ELECTRICALLY CONDUCTIVE RUBBER LAYER IN LAND PORTION DEFINED BETWEEN CIRCUMFERENTIAL GROOVES

CROSS-REFERENCE TO RELATED APPLICATION

This application is a continuation-in-part of the application Ser. No. 08/896,953 filed Jul. 18, 1997 now abandoned.

BACKGROUND OF THE INVENTION

1. Field of the Invention

This invention relates to a pneumatic tire having an electrically conducting path formed by using an electrically conductive rubber composition. More particularly, it relates to a pneumatic tire having a low conductive tread compounded with a great amount of a filler such as silica for the improvement of low fuel consumption in which an electrically conducting path is formed in the tread by using an electrically conductive rubber composition for the prevention of electricity.

2. Description of Related Art

The pneumatic tire provided with a tread having a lower fuel consumption, particularly a silica-containing tread is high in electric resistance and low in the electric conductivity, so that static electricity generated from a vehicle body or a tire is hardly dissipated to ground surface through the tread. Hence there are problems such as noise to radio, electric shock, spark and the like.

There are known the following methods for solving the above problems.

As a first method, an electrically conductive rubber thick sheet is extended in a central portion of a tread in a widthwise direction thereof from an outer surface of the tread to a base rubber of the tread (see EP 0 658 452B1 and JP-A-8-34204), or an electrically conductive rubber thin sheet is extended from a shoulder portion of the tread to an inside of a sidewall (see U.S. Pat. No. 5,518,055). Also an electrically conductive film is arranged on only the outer surface of the tread as a whole (see EP 0 718 126A2). Furthermore, EP 0 718 126A1 discloses that an electrically conductive member is disposed beneath the tread and a projecting extension is formed to extend from such an electrically conductive member toward an outer surface of the tread. As to the former case, there is a description that the projecting extension is continuously extended in a circumferential direction of the tread at a thick thickness.

As a second method, carbon black different from that usually used in the tire and having an excellent electric conductivity is compounded with a tread rubber.

As a third method, there is a method of applying onto a surface of a tread an electrically conductive substance such as a water-based electrically conducting rubber cement containing an electrically conductive carbon black or the like during the extrusion of the tread in the production of the tire (e.g. see JP-A-8-120120). According to this method, even if a product tire after vulcanization is mounted onto a passenger car and run over a long time to wear a ground contact region of the tread, the electrically conducting substance still remains in side walls of many grooves forming a tread pattern of the ground contact region, which can dissipate static electricity charged in the entirety of the tire to ground surface.

However, all of these methods have problems in the production and quality as mentioned below and are not necessarily satisfied.

For example, the antistatic effect is maintained at an initial running stage when the electrically conductive thick rubber layer is arranged in a central portion of the tread in its widthwise direction from the surface of the tread up to a rubber beneath the tread as disclosed in EP 0 658 452 and JP-A-8-34204, but there is a problem that if general-purpose carbon black is used as a filler, the electrically conducting path is interrupted at the running end stage due to the promotion of wearing of the electrically conductive layer to eliminate the antistatic effect. Particularly, in order to maintain the effect of improving the wear resistance of the tread rubber or a tread cap rubber, the wear resistance of the electrically conductive rubber layer should be improved like the tread cap rubber, but it turns out that only the tread cap rubber actually contacts the ground and hence the antistatic effect can not be obtained.

Further, when several parts by weight of the electrically conductive carbon black based on 100 parts by weight of rubber ingredient is added to the tread rubber for the tire, the electric resistance of the tread rubber is lowered, but the low fuel consumption as a primary object of the tire is considerably degraded. Also, the carbon black itself is considerably low in the reinforcing effect for the polymer and hence there is caused a problem of lowering the wear resistance of the tire tread.

In the method of applying the water-based rubber cement containing the electrically conductive carbon black onto the surface of the tread cap rubber, there is a problem in the stationary stability of the cement itself and hence there is a fear of causing phase separation. Furthermore, it is required to use various stabilizers in order to prevent the blowing in the application, which degrades the durability of the resulting rubber cement film after the vulcanization and also results in the contamination of the mold for vulcanization. Moreover, the rubber composition used in the tread cap rubber is hydrophobic, so that when the above water-based rubber cement is applied onto the tread cap rubber, drying takes a long time and the application unevenness is caused and hence the durability of the applied film is degraded. Also, the adhesion force at the boundary between the tread cap rubber and the film of the water-based rubber cement lowers and hence boundary peeling is caused during the running of the tire, so that there is caused a problem that the antistatic effect is not obtained at the end stage of tire running due to the breakage of electrically conducting path.

Moreover when the electrically conductive rubber layer is disposed on a shoulder portion of the tread as disclosed in U.S. Pat. No. 5,518,055 and EP 0 718 126, the effect is developed at an initial running stage, but the rubber layer is rapidly removed from a ground contact region due to the wearing to lose the effect. That is, the shoulder portion is prematurely worn due to uneven wear in the tire as compared with the central portion of the tread to form a step difference between the central portion and the shoulder portion and hence the shoulder portion is not necessarily contacted with ground during the usual running. Therefore, even if the electrically conductive rubber layer remains in a zone ranging from a tread end toward a sidewall portion, it is difficult to provide an antistatic effect because the rubber portion is already removed from the tread portion.

On the other hand, when the electrically conductive thin sheet is disposed on the groove, the effect is developed at an initial running stage, but the neighborhood of the groove edge is rapidly worn during the running and hence the sheet is not always contacted with ground. Further, it has been confirmed that the electrically conductive rubber sheet is cut out by stones entered in the groove during the running and is not often retained in the groove on and after a middle running stage.

SUMMARY OF THE INVENTION

It is, therefore, an object of the invention to provide a low fuel consumption pneumatic tire comprising an electrically low conductive tread compounded with a great amount of a filler such as silica and having considerably improved antistatic effect and stationary stability.

It is another object of the invention to maintain the higher antistatic effect in the above pneumatic tire over a period ranging from the initial running stage up to the middle running stage and after thereof.

The inventors have made various studies in order to solve the aforementioned problems and found that the above object is achieved by applying a rubber layer having a particular specific resistance to a given place of a low fuel consumption pneumatic tire comprising an electrically low conductive tread to form an electrically conducting path and as a result the invention has been accomplished.

According to the invention, there is the provision of a pneumatic tire comprising a tread of a cap and base structure and at least one electrically conductive rubber layer having a specific resistance of not more than $10^6$ $\Omega \cdot$cm and extending in a circumferential direction of the tread. The electrically conductive rubber layer has a thickness of 0.1–1 mm and extends inward from an outer surface of the tread in a radial direction and contacts with a tread base rubber having a specific resistance of not more than $10^8$ $\Omega \cdot$cm adjacent to an inside of a tread cap rubber having a specific resistance of more than $10^8$ $\Omega \cdot$cm. The electrically conductive rubber layer is disposed in a region corresponding to 70% of a ground contact width of a new tire and in a land portion defined between circumferential grooves located in the region so as to contact both sides of the rubber layer in a widthwise direction thereof with the tread cap rubber. The electrically conductive rubber layer is made from a rubber composition containing 40–100 parts by weight of carbon black having a nitrogen adsorption specific surface area ($N_2SA$) of 130–150 $m^2$/g and a dibutyl phthalate absorption (DBP) of 110–135 ml/100 g based on 100 parts by weight of a diene rubber ingredient.

In a preferable embodiment of the invention, only one electrically conductive rubber layer is disposed near to the equatorial plane of the tire in a region corresponding to 50% of the ground contact width of the new tire.

In another preferable embodiment of the invention, the tread base rubber has a tan δ at 60° C. smaller than that of the tread cap rubber, and the tan δ at 60° C. of the tread base rubber is not more than 0.14.

In the other preferable embodiment of the invention, the tread base rubber has a thickness of 1.5–3.0 mm.

BRIEF DESCRIPTION OF THE DRAWINGS

The invention will be described with reference to the accompanying drawings, wherein.

DESCRIPTION OF PREFERRED EMBODIMENTS

Figure 1:
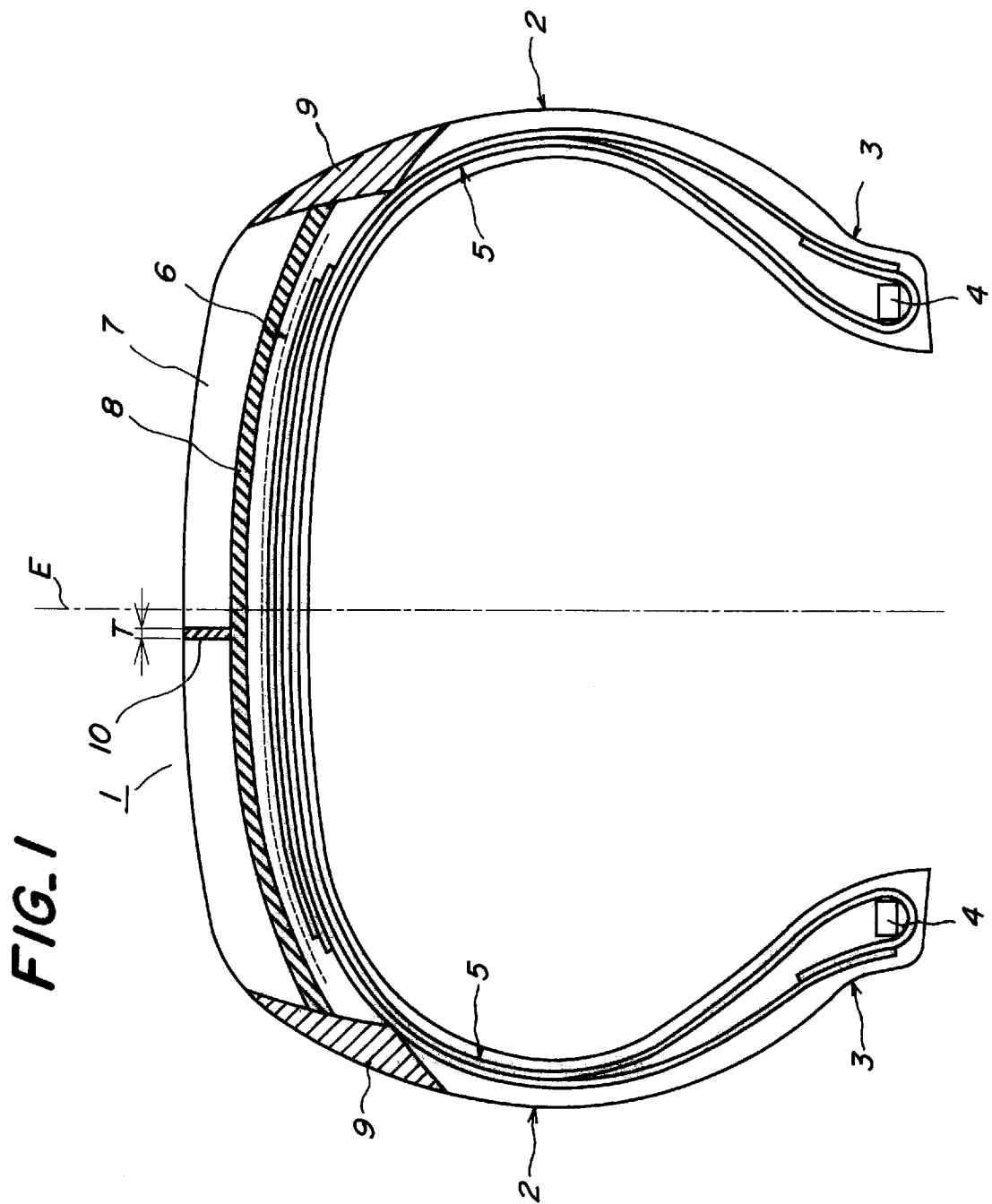
FIGS. 1 to 2 are diagrammatically section views of various embodiments of the pneumatic tire according to the invention, respectively.

In the invention, the reason why the electrically conductive rubber layer is disposed in the region corresponding to 70% of the ground contact width of the new tire is based on the fact that since wearing of the shoulder portion or so-called shoulder wear is particularly and often caused on and after a middle stage of service life, even if the shoulder wear is caused, the electrically conductive rubber layer always contacts the road surface at the ground contact region. Further, the reason why the electrically conductive rubber layer does not cover the groove but extends in the tread rubber so as to sandwich both sides thereof in the widthwise direction between the tread rubbers is due to the fact that when the electrically conductive rubber layer is formed on the surface of the groove, it is cut out by wearing of the groove edge or stone-biting and does not contact the road surface on and after the middle stage of the service life.

In the invention, it is preferable that at least one of styrene-butadiene rubber (SBR), butadiene rubber (BR) and natural rubber (NR) is used as a diene rubber in the rubber composition for the formation of the electrically conductive rubber layer having a specific resistance of not more than $10^6$ $\Omega \cdot$cm from a viewpoint of the durability.

Further, the rubber composition for the formation of the electrically conductive rubber layer according to the invention contains 40–100 parts by weight, based on 100 parts by weight of the diene rubber, of carbon black having a nitrogen adsorption specific surface area ($N_2SA$) of 130–150 $m^2$/g and a dibutyl phthalate adsorption (DBP) of 110–135 ml/100 g. That is, the use of such a high structure carbon black improves the durability of the rubber layer forming an electrically conducting path and can develop the antistatic effect up to the running end stage of the tire. Moreover, the value of $N_2SA$ is measured according to ASTM D3037-89 and the value of DBP is measured according to ASTM D2414—90. When $N_2SA$ exceeds 150 $m^2$/g or DBP exceeds 135 ml/100 g, the viscosity of rubber is too high to degrade the operability in the extrusion shaping of the electrically conductive thin rubber layer as defined in the invention and also rubber is not sufficiently flowed to form a portion containing no rubber layer in the tread.

When the amount of the carbon black compounded is less than 40 parts by weight based on 100 parts by weight of the diene rubber, the reinforcing action is insufficient. When it exceeds 100 parts by weight, if the amount of the softening agent is small, the cured product becomes too hard and cracking or the like is caused. If the amount of the softening agent is large, the wear resistance lowers. Moreover, the rubber composition according to the invention may properly be compounded with additives usually used in rubber articles such as vulcanizing agent, vulcanization accelerator, accelerator activator, softening agent, antioxidant and the like in addition to the carbon black.

The structure of the pneumatic tire according to the invention will concretely be described below.

In the pneumatic tire according to the invention, the rubber layer forms a continuous layer extending in the circumferential direction of the tire while contacting with an outer surface of a tread cap rubber having a specific resistance of more than $10^8$ $\Omega \cdot$cm and a part of a tread base rubber. The word "a part" used herein means a part of a member viewed in a widthwise direction of the tire as shown in FIGS. 1–2, and forms a continuous layer viewing in the circumferential direction.

In FIG. 1 is shown a first embodiment of the pneumatic tire according to the invention. This tire comprises a tread portion 1, a pair of sidewall portions 2, a pair of bead portions 3, a bead core 4 embedded in each bead portion, a carcass 5 comprised of two plies and a belt 6 comprised of two belt layers. The tread portion 1 comprises a tread cap rubber 7 located at a side of a ground contact region, a tread base rubber 8 located inward from the tread rubber and a pair of mini-side rubbers 9 located at both sides of the tread cap rubber 7 and the tread base rubber 8. In this case, the tread cap rubber 7 is an electrically low conductive rubber, and the tread base rubber 8 is an electrically high conductive rubber having a specific resistance of not more than $10^8$ Ω·cm, and the mini-side rubber 9 is an electrically high conductive rubber having a specific resistance of not more than $10^8$ Ω·cm. An electrically high conductive rubber layer 10 having a specific resistance of not more than $10^6$ Ω·cm and an extremely thin gauge T extends substantially straightforward from the base rubber 8 up to a ground contact surface of the tread portion 1.

Figure 2:
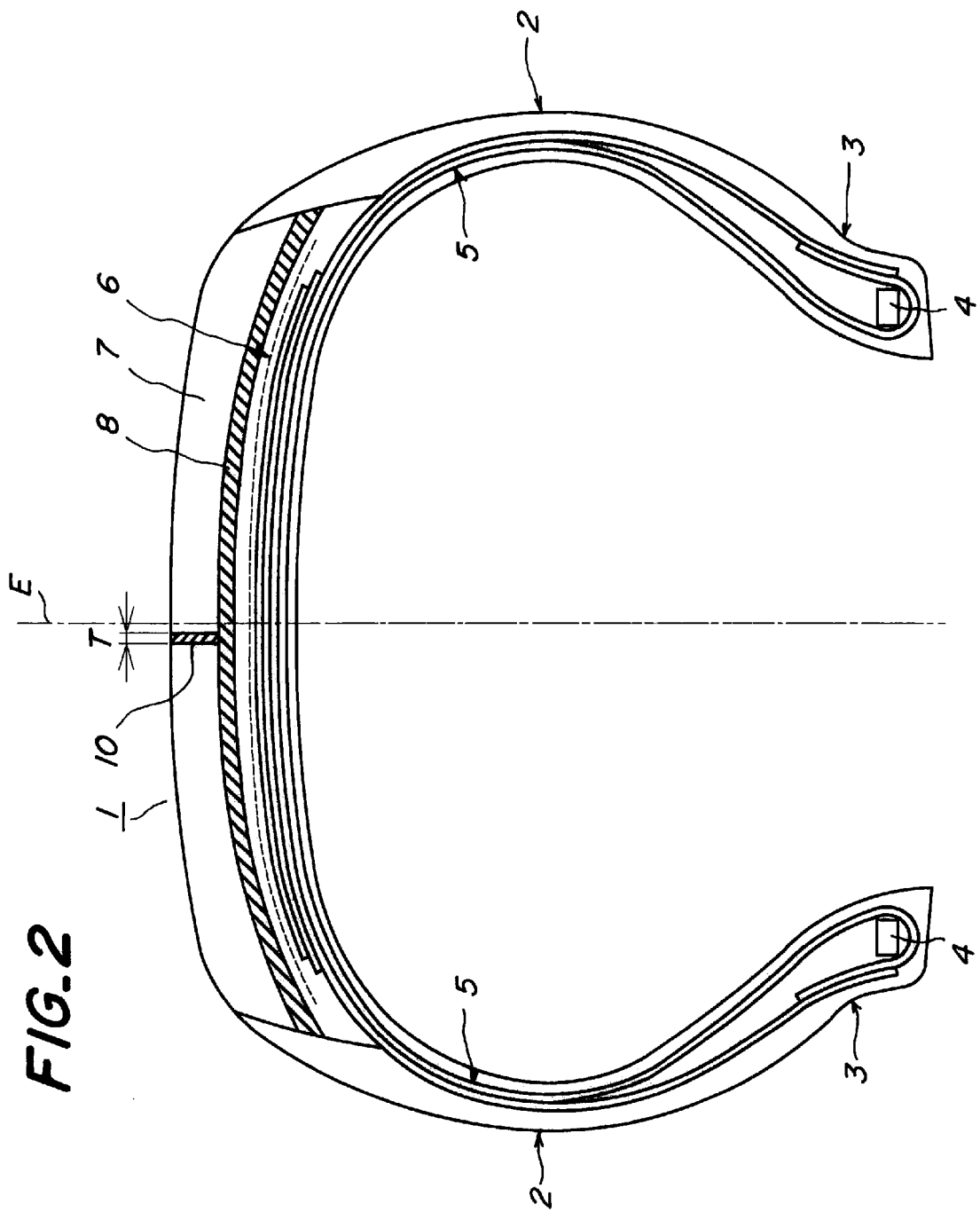

In FIG. 2 is shown a second embodiment of the pneumatic tire according to the invention, which is another modified embodiment of FIG. 1. In this case, the use of the mini-side rubber 9 is omitted. An electrically high conductive rubber layer 10 having an extremely thin gauge T extends substantially straightforward from the base rubber 8 up to a ground contact surface of the tread portion 1 like the first embodiment.

In a preferable embodiment of the pneumatic tire according to the invention, at least one continuous layer viewing in the widthwise direction of the tread extends continuously in the circumferential direction between an outer surface of a tread cap rubber and a tread base rubber adjacent to an inside of the tread cap rubber and having a specific resistance of not more than $10^6$ Ω·cm.

In the formation of the electrically conductive rubber layer according to the invention, when an uncured rubber for the formation of the tread is supplied to an extruder and shaped into a given form, an electrically conductive uncured rubber is passed through an independent pathway isolated from a pathway for another uncured rubber and united with another uncured rubber (for the tread) at an opening portion of a slit in the independent pathway to guide toward an extrusion die. The opening portion of the slit is 0.1–1.0 mm, preferably 0.2–0.8 mm.

In general, silica-containing rubber is used in the tread for simultaneously establishing low rolling resistance and high wet running performances. On the other hand, the rubber layer as the continuous layer is made from an electrically conductive rubber containing a greater amount of carbon black and is considerably high in hysteresis loss as compared with the silica-containing rubber. As a result, as the thickness of the rubber layer becomes thicker, the rolling resistance of the tire is degraded. Furthermore, the high carbon black-containing rubber layer is poor in the wear resistance as compared with the silica-containing rubber, so that the wearing of the continuous layer made from a thick rubber layer is promoted as compared with the silica-containing rubber during the running of the tire and finally a portion of the continuous layer not contacting with ground is created at the running end stage to increase the electric resistance of the tire.

The thickness of the rubber layer as a continuous layer after the curing is 0.1–1 mm, preferably 0.2–0.8 mm considering the durability up to the running end stage. When the thickness exceeds 1 mm, the rolling resistance of the tire is degraded and the occurrence of uneven wear is promoted as mentioned above and also the peeling phenomenon is apt to be caused due to the difference of modulus of elasticity to the tread rubber. It is difficult to stably maintain the low value of electric resistance in the tire up to the running end stage. Further, in order to prevent the occurrence of uneven wear due to the difference in the properties between the tread rubber and the continuous rubber layer, it is required to provide a continuous thick rubber layer in accordance with the various compositions of the tread rubber used in commercially available tires, so that the productivity of the tire undesirably lowers. When it is less than 0.1 mm, it is possible to obstruct the formation of the continuous rubber layer due to the difficulty of extrusion operation of thinner rubber sheet and the rubber flowing during vulcanization.

An example of electric resistance in the pneumatic tire according to the invention between ground surface and a rim will concretely be described with reference to FIG. 1.

In the pneumatic tire shown in FIG. 1, even if a specific resistance of the tread cap rubber is as high as $10^{11}$ μ·cm, when a specific resistance of the rubber layer 10 is $10^5$ Ω·cm, a specific resistance of the tread base rubber is $10^8$ Ω·cm, a specific resistance of the mini-side rubber is $10^6$ Ω·cm, specific resistance of a sidewall rubber is $10^6$ Ω·cm and a specific resistance of a rubber chafer (not shown) is $10^5$ Ω·cm, an electrically conducting path of ground surface→tread cap rubber →tread base rubber→mini-side rubber→sidewall rubber→rubber chafer →rim→vehicle body is formed through the continuous rubber layer 10, whereby the electric resistance of the tire can be maintained at a low value irrespectively of the specific resistance of the tread cap rubber. In case of the pneumatic tire having no mini-side rubber, the similar effect can be obtained by arranging the continuous rubber layer between the tread cap rubber and the sidewall rubber to form an electrically conducting path from the tread cap rubber to the sidewall portion. In any case, it is favorable that the value of electric resistance of the tire between ground surface and rim based on the above path is not more than $10^8$ Ω from a viewpoint of the antistatic effect.

The following examples are given in illustration of the invention and are not intended as limitations thereof.

Tread cap rubber, tread base rubbers P, Q and electrically conductive rubber compositions A, B used in the pneumatic tire are prepared according to a compounding recipe as shown in Tables 1–3.

TABLE 1

| Tread Cap Rubber Composition (unit: parts by weight) | |
|---|---|
| Styrene-butadiene rubber*1 | 96 |
| Butadiene rubber*2 | 30 |
| SiO$_2$*3 | 60 |
| Carbon black (N234)*4 | 20 |
| Silane coupling agent*5 | 6 |
| ZnO | 3 |
| Stearic acid | 2 |
| Aromatic oil | 10 |
| Vulcanization accelerator (CBS)*6 | 1.5 |
| Vulcanization accelerator (DPG)*7 | 2 |
| Sulfur | 1.5 |

Note)
*1: SBR1712, trade name, made by Japan Synthetic Rubber Co., Ltd.
*2: 96% cis-bond
*3: Nipsil VN3
*4: N$_2$SA: 126 m$^2$/g, DBP: 125 ml/100 g
*5: Si69 made by Degussa
*6: N-cyclohexyl-2-benzothiazyl sulfenamide
*7: diphenyl guanidine

TABLE 2

Tread Base Rubber Composition (unit: parts by weight)

|  | P | Q |
|---|---|---|
| Natural rubber | 70 | 70 |
| Styrene-butadiene rubber*1 | 41.25 | 41.25 |
| Carbon black (N110)*8 | — | 70 |
| Carbon black (N330)*9 | 45 | — |
| ZnO | 3 | 3 |
| Stearic aid | 2 | 2 |
| Aromatic oil | — | 3.76 |
| Vulcanization accelerator (NS)*10 | 0.8 | 0.8 |
| Vulcanization accelerator (DPG)*7 | 0.2 | 0.2 |
| Sulfur | 2 | 2 |

Note)
*8: $N_2SA$: 143 $m^2/g$, DBP: 113 ml/100 g
*9: $N_2SA$: 83 $m^2/g$, DBP: 102 ml/100 g
*10: N-tert-butyl-2-benzothiazolyl sulfenamide

TABLE 3

(unit: parts by weight)

|  | Rubber composition (A) | Rubber composition (B) |
|---|---|---|
| Natural rubber | 40 | 40 |
| Styrene-butadiene rubber*11 | 60 | 60 |
| Carbon black (N134)*12 | 60 | — |
| Carbon black (N330)*9 | — | 65 |
| Aromatic oil | 15 | 15 |
| ZnO | 2 | 2 |
| Stearic acid | 2 | 2 |
| Antioxidant*13 | 1 | 1 |
| Vulcanization accelerator (DPG)*7 | 0.2 | 0.2 |
| Vulcanization accelerator (NS)*10 | 0.8 | 0.8 |
| Sulfur | 1.5 | 1.5 |

Note)
*11: SBR1500, trade name, made by Japan Synthetic Rubber Co., Ltd.
*12: $N_2SA$: 146 $m^2/g$, DBP: 127 ml/100 g
*13: N-(1,3-dimethylbutyl)-N'-phenyl-p-phenylene diamine A pneumatic tire having a tire size of 185/70R14 is manufactured by continuously arranging a rubber layer 10 made from each of the rubber composition A, B in a central portion of a tread 1 in the circumferential direction of the tire so as to contact at a belt 6 located beneath the tread as shown in FIG. 2. In new tires after vulcanization, the rubber layer 10 has a thickness as shown in Table 4. Moreover, the tread cap rubber has tan δ at 60° C. of 0.18, and the rubber layer made from the rubber composition A has tan δ at 60° C. of 0.29 and the rubber layer made from the rubber composition B has tan δ at 60° C. of 0.17. As the tread base rubber, the rubber composition P has tan δ at 60° C. of 0.13 and the rubber composition Q has tan δ at 60° C. of 0.31.

Figure 3:
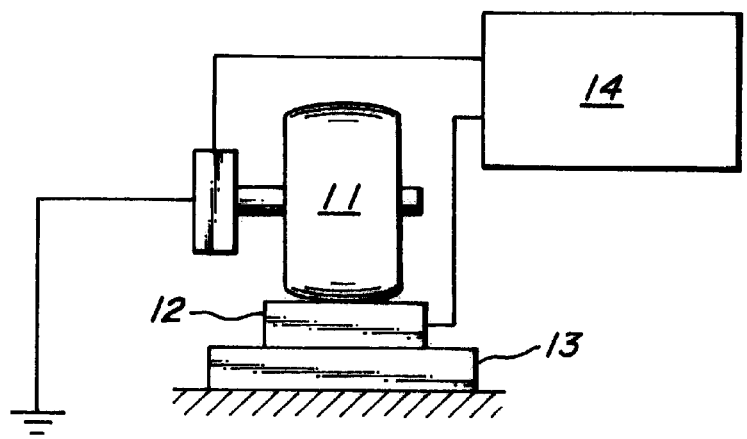
FIG. 3 is a schematic view of an apparatus for measuring an electric resistance of a tire used in examples.

Further, an electric resistance of each of these tires is measured according to WdK 110 Sheet 3 of German Association of Rubber Industry by placing an assembly 11 of a test tire and a rim on a steel plate 12 placed on an insulation plate 13 and then flowing electric current of 1000 V between the rim and the steel plate to read electric resistance by means of a high resistance meter of Model HP4339A made by Hewlett Packard as shown in FIG. 3.

Moreover, the specific resistance of the rubber layer 10 as the continuous layer is measured as follows.

Figure 4:
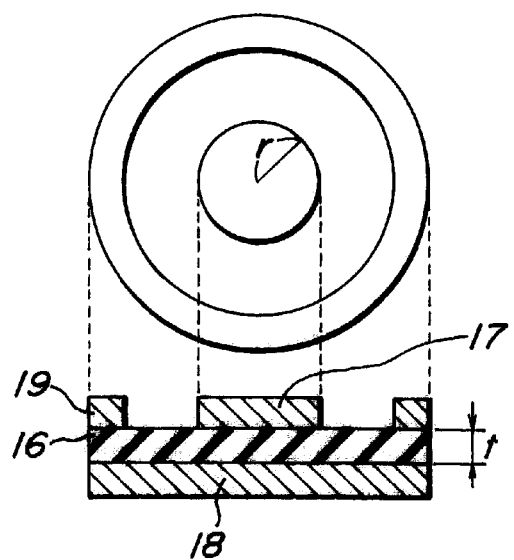
FIG. 4 is a schematic view illustrating a measurement of an electric resistance R in a sample rubber.
Figure 5:
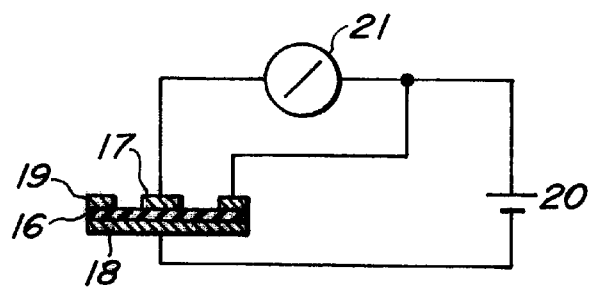
FIG. 5 is a schematic view of the testing circuit.

That is, a cured sample sheet having a radius (r) of 25 mm and a thickness (t) of 2 mm is made from each of the rubber compositions A and B and then placed in a test box for the measurement of insulation resistance made by Advance Corporation as shown in FIGS. 4 and 5 to measure a sheet resistance (R). Next, the specific resistance ρ(Ω·cm) of the rubber layer 10 is calculated according to the following equation using the measured values:

$$\rho = (\pi \times r^2/t) \times R$$

In FIGS. 5 and 6, numeral 16 is a sample sheet, numeral 17 a main electrode, numeral 18 an opposite electrode, numeral 19 a guard electrode, numeral 20 a battery and numeral 21 a meter.

The electric resistances in new tire, after the running over 10000 km and after the running over 40000 km and the rolling resistance of new tire are measured to obtain results as shown in Table 4.

TABLE 4

|  |  | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|---|
| Electrically conductive rubber layer | composition | A | A | — | A | A | A | B | B |
|  | thickness (mm) | 0.2 | 0.8 | 0 | 1.5 | 6 | 0.8 | 0.8 | 0.8 |
|  | specific resistance (Ωcm) | $10^6$ | $10^6$ | — | $10^6$ | $10^6$ | $10^6$ | $10^6$ | $10^6$ |
| Tread base rubber | composition | P | P | — | P | P | Q | Q | P |
|  | specific resistance (Ωcm) | $10^8$ | $10^8$ | — | $10^8$ | $10^8$ | $10^6$ | $10^6$ | $10^8$ |
| Rolling resistance of new tire (index) *14 |  | 100 | 100 | 98 | 99 | 97 | 94 | 94 | 100 |
| Electric resistance (Ω) | new tire | $10^8$ | $10^8$ | $10^{11}$ | $10^8$ | $10^8$ | $10^6$ | $10^8$ | $10^8$ |
|  | after the running over 10,000 km *15 | $10^8$ | $10^8$ | $10^{11}$ | $10^8 \sim 10^9$ | $10^8 \sim 10^9$ | $10^6$ | $10^8 \sim 10^9$ | $10^8 \sim 10^9$ |
|  | after the running over 40,000 km *15 | $10^8$ | $10^8$ | $10^{11}$ | $10^8 \sim 10^{10}$ | $10^9 \sim 10^{11}$ | $10^6$ | $10^{10} \sim 10^{11}$ | $10^{10} \sim 10^{11}$ |

TABLE 4-continued

|  | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|

*14 A test tire subjected to an internal pressure of 1.70 kgf/cm$^2$ is placed on a drum having an outer diameter of 1708 mm trained at a speed of 80 km/h under JIS 100% load for 30 minutes. After the internal pressure is readjusted, the rotating speed of the drum is raised to 200 km/h and then the rotation of the drum is stopped to inertially move the drum from 185 km/h to 20 km/h, during which inertia moment is measured and substituted for the following equation to calculate the rolling resistance (RR) of the tire. The rolling resistance is represented by an index value on the basis that Comparative Example 1 is 100. The larger the index value, the lower the rolling resistance. RR = ds/dt(ID/RD$^2$ + It/Rt$^2$) - resistance of drum itself wherein ID: inertia moment of the drum    It: inertia moment of tire    RD: radius of drum    Rt: radius of tire
*15 In Comparative Examples and Examples, the electric resistance after the running over 10000 km and 40000 km is measured on four points on the circumference of the tire.

*14: A test tire subjected to an internal pressure of 1.70 kgf/cm$^2$ is placed on a drum having an outer diameter of 1708 mm and trained at a speed of 80 km/h under JIS 100% load for 30 minutes. After the internal pressure is readjusted, the rotating speed of the drum is raised to 200 km/h and then the rotation of the drum is stopped to inertially move the drum from 185 km/h to 20 km/h, during which inertia moment is measured and substituted for the following equation to calculate the rolling resistance (RR) of the tire. The rolling resistance is represented by an index value on the basis that Comparative Example 1 is 100. The larger the index value, the lower the rolling resistance.

$$RR = ds/dt(ID/RD^2 + It/Rt^2) - \text{resistance of drum itself}$$

wherein ID: inertia moment of drum

It: inertia moment of tire

RD: radius of drum

Rt: radius of tire *15: In Comparative Examples and Examples, the electric resistance after the running over 10000 km and 40000 km is measured on four points on the circumference of the tire.

As seen from Table 4, in Examples 1 and 2, the effect of reducing the electric resistance of the tire is observed even after the running over 40,000 km without the degradation of the rolling resistance.

In Comparative Example 1, the effect of reducing the electric resistance of the tire is not observed because the electrically conductive rubber layer is not existent in the tread.

As seen from Comparative Examples 2 and 3, as the thickness of the electrically conductive rubber layer becomes thick, the electrically conductive rubber layer, which is previously worn during the running of the tire, shuts off the electrically conducting path and hence the electric resistance considerably increases even after the running over 40,000 km. Also, the rolling resistance of the tire is degraded.

As seen from Comparative Example 4, when tan δ at 60° C. of the tread base rubber is high, the electric resistance is maintained at a low level, but the rolling resistance is considerably degraded. In this case, there is no meaning of aiming the improvement of the rolling resistance by compounding silica with the tread rubber.

Moreover, Comparative Example 5 is remarkably poor in the rolling resistance likewise Comparative Example 4. Further, carbon black used in Comparative Examples 5 and 6 is outside ranges defined in the present invention, so that the durability of the electrically conductive rubber layer is poor and the wearing thereof is fast and hence the electric resistance rises after the running over 40,000 km.

As mentioned above, the pneumatic tire according to the invention develops the excellent antistatic effect up to the running end stage and has a high stationary stability by applying the rubber layer made from the electrically conductive rubber composition to a given place of a low fuel consumption pneumatic tire comprising a tread made from a silica-containing tread rubber having a low electrical conductivity. Therefore, the pneumatic tire according to the invention develops excellent effects as an antistatic tire.

What is claimed is:

1. A pneumatic tire comprising; a tread of a cap and base structure and at least one electrically conductive rubber layer having a specific resistance of not more than $10^6$ Ω·cm and extending in a circumferential direction of the tread, in which the electrically conductive rubber layer has a thickness of 0.2–0.8 mm and extends inward from an outer surface of the tread in a radial direction and contacts with a tread base rubber having a specific resistance of not more than $10^8$ Ω·cm adjacent to an inside of a tread cap rubber having a specific resistance of more than $10^8$ Ω·cm; the electrically conductive rubber layer is disposed in a region corresponding to 70% of a ground contact width of a new tire and in a land portion defined between circumferential grooves located in the region so as to contact both sides of the rubber layer in a widthwise direction thereof with the tread cap rubber; and the electrically conductive rubber layer is made from a rubber composition containing 40–100 parts by weight of carbon black having a nitrogen adsorption specific surface area (N$_2$SA) of 130–150 m$^2$/g and a dibutyl phthalate absorption (DBP) of 110–135 ml/100 g based on 100 parts by weight of a diene rubber ingredient.

2. A pneumatic tire according to claim 1, wherein only one electrically conductive rubber layer is disposed near to the equatorial plane of the tire in a region corresponding to 50% of the ground contact width of the new tire.

3. A pneumatic tire according to claim 1, wherein the tread base rubber has a tan δ at 60° C. smaller than that of the tread cap rubber.

4. A pneumatic tire according to claim 3, wherein the tan δ at 60° C. of the tread base rubber is not more than 0.14.

5. A pneumatic tire according to claim 1, wherein the tread base rubber has a thickness of 1.5–3.0 mm.

* * * * *